(12) United States Patent
Malavatu et al.

(10) Patent No.: US 11,299,088 B2
(45) Date of Patent: Apr. 12, 2022

(54) ADAPTIVE WORK VEHICLE LIGHTING SYSTEM AND METHOD OF ADAPTIVELY ILLUMINATING A WORK AREA

(71) Applicant: DEERE & COMPANY, Moline, IL (US)

(72) Inventors: Jayachandra Malavatu, Venkatagiri (IN); Sesha Sai Deepika Rani Ravuri, Magarpatta (IN)

(73) Assignee: DEERE & COMPANY, Moline, IL (US)

( * ) Notice: Subject to any disclaimer, the term of this patent is extended or adjusted under 35 U.S.C. 154(b) by 1 day.

(21) Appl. No.: 16/415,230

(22) Filed: May 17, 2019

(65) Prior Publication Data
US 2020/0361364 A1    Nov. 19, 2020

(51) Int. Cl.
| | | |
|---|---|---|
| *B60Q 1/24* | (2006.01) | |
| *A01G 23/083* | (2006.01) | |
| *F21V 21/15* | (2006.01) | |
| *F21W 131/40* | (2006.01) | |

(52) U.S. Cl.
CPC .......... *B60Q 1/245* (2013.01); *A01G 23/083* (2013.01); *F21V 21/15* (2013.01); *F21W 2131/40* (2013.01)

(58) Field of Classification Search
CPC . B60Q 1/245; B60Q 1/08; B60Q 1/18; B60Q 1/24; B60Q 1/085; B60Q 1/2657; B60Q 1/26; B60Q 2300/45; A01G 23/083; F21V 21/15; F21V 33/00; F21W 2131/40; E02F 9/0858; E02F 9/264; E02F 3/40; F21S 9/04; G01B 11/00; G01B 11/25; G06K 9/00
See application file for complete search history.

(56) References Cited

U.S. PATENT DOCUMENTS

| | | | |
|---|---|---|---|
| 10,106,072 B2 | 10/2018 | Linan et al. | |
| 2010/0245542 A1 | 9/2010 | Kim et al. | |
| 2017/0120800 A1* | 5/2017 | Linan | ................. B60Q 1/08 |
| 2017/0138287 A1* | 5/2017 | Faris | ................. F02D 41/083 |

FOREIGN PATENT DOCUMENTS

| | | |
|---|---|---|
| DE | 202014011228 U1 | 9/2018 |
| JP | H061180 A | 1/1994 |
| JP | 2000127841 A | 5/2000 |
| JP | 2002129593 A | 5/2002 |
| KR | 20160048702 A | 5/2016 |
| WO | 2014195568 A1 | 12/2014 |

OTHER PUBLICATIONS

German Search Report issued in counterpart application No. 102020205751.6 dated Jan. 15, 2021 (10 pages).

* cited by examiner

*Primary Examiner* — Oluseye Iwarere
*Assistant Examiner* — Jose M Diaz

(57) ABSTRACT

An adaptive lighting system for a work vehicle controlled by an operator from an operator station and having a work tool and a method for illuminating a work area are provided. The system includes at least one lighting member configured to illuminate at least one portion of a work area, an actuator coupled to the at least one lighting member and configured to position the at least one lighting member relative to the operator station, and a controller in communication with the actuator and configured to control positioning of the at least one lighting member via the actuator based on an operator control position and a position of the work tool.

20 Claims, 4 Drawing Sheets

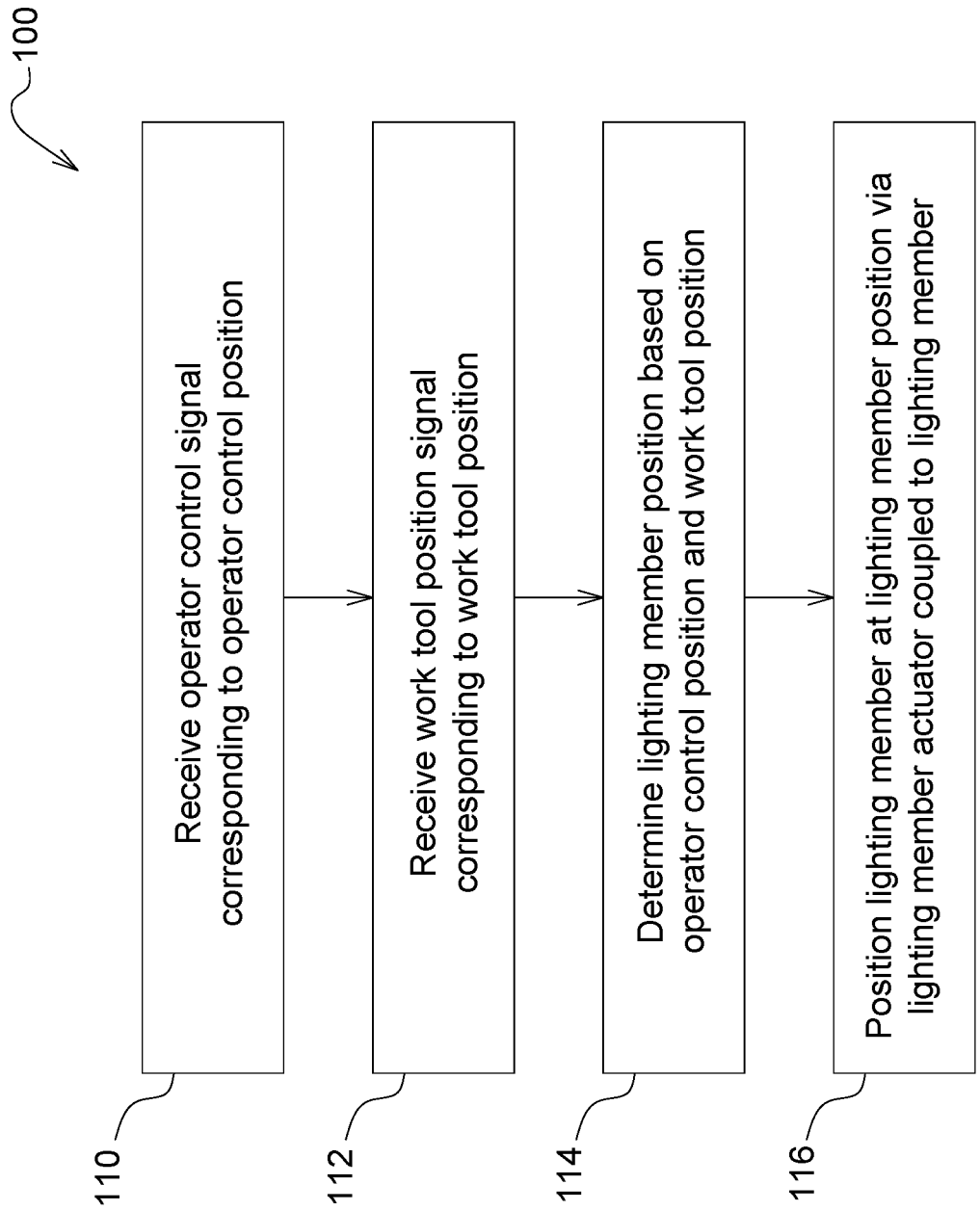

US 11,299,088 B2

ADAPTIVE WORK VEHICLE LIGHTING SYSTEM AND METHOD OF ADAPTIVELY ILLUMINATING A WORK AREA

BACKGROUND

Work vehicles may be equipped with specialized work tools or implements designed to perform tasks useful in various industries, such as the agriculture, construction and forestry industries. A work tool may be mounted to a boom or boom assembly, which may be controlled by an operator to move the work tool relative to the body or operator station of the work vehicle. Work tools may include, without limitation, buckets, grab forks, blades, bale spears, felling heads, and grapples. The work tool and/or boom may be configured to operate within a surrounding work area to allow horizontal movement, vertical movement, and inward/outward movement of the work tool, such as during cutting and harvesting operations with a forestry work vehicle in a non-limiting example. Due to the operating and overall costs associated with the work vehicle, availability of operators, and certain operating conditions, it is desirable to maximize operating time of the work vehicle without interruptions, including during low-light, weather or environment-impacted, or nighttime operations that may affect visibility.

SUMMARY

Various aspects of examples of the present disclosure are set out in the claims.

In accordance with an embodiment of the present disclosure, an adaptive lighting system for a work vehicle controlled by an operator from an operator station and having a work tool is provided. The system includes at least one lighting member configured to illuminate at least one portion of a work area. The system further includes an actuator coupled to the at least one lighting member and configured to position the at least one lighting member relative to the operator station. The system further includes a controller in communication with the actuator and configured to control positioning of the at least one lighting member via the actuator based on an operator control position and a position of the work tool.

In accordance with an embodiment of the present disclosure, an adaptive lighting system for a work vehicle controlled by an operator and having a work tool is provided. The system includes at least one lighting member configured to illuminate at least one portion of a work area with a beam of light. The system further includes a focus member establishing a focus of the beam of light. The system further includes a focus member actuator coupled to the focus member and configured to adjust the focus of the beam of light. The system further includes a controller in communication with the focus member actuator and configured to control the focus of the beam of light from the at least one lighting member via the focus member actuator based on an operator control position and a position of the work tool such that the focus of the beam of light corresponds to the position of the work tool.

In accordance with an embodiment of the present disclosure, a method of adaptively illuminating a work area with a work vehicle having a work tool is provided. The method includes receiving an operator control position signal corresponding to an operator control position of an operator control member, receiving a work tool position signal corresponding to a work tool position of the work tool, determining a lighting member position based on the operator control position and the work tool position, and positioning a lighting member at the lighting member position via a lighting member actuator coupled to the lighting member.

The above and other features will become apparent from the following description and accompanying drawings.

BRIEF DESCRIPTION OF THE DRAWINGS

The detailed description of the drawings refers to the accompanying figures in which:

FIG. 4 illustrates a method of illuminating a work area in accordance with an embodiment of the present disclosure.

Like reference numerals are used to indicate like elements throughout the several figures.

DETAILED DESCRIPTION

Figure 1:
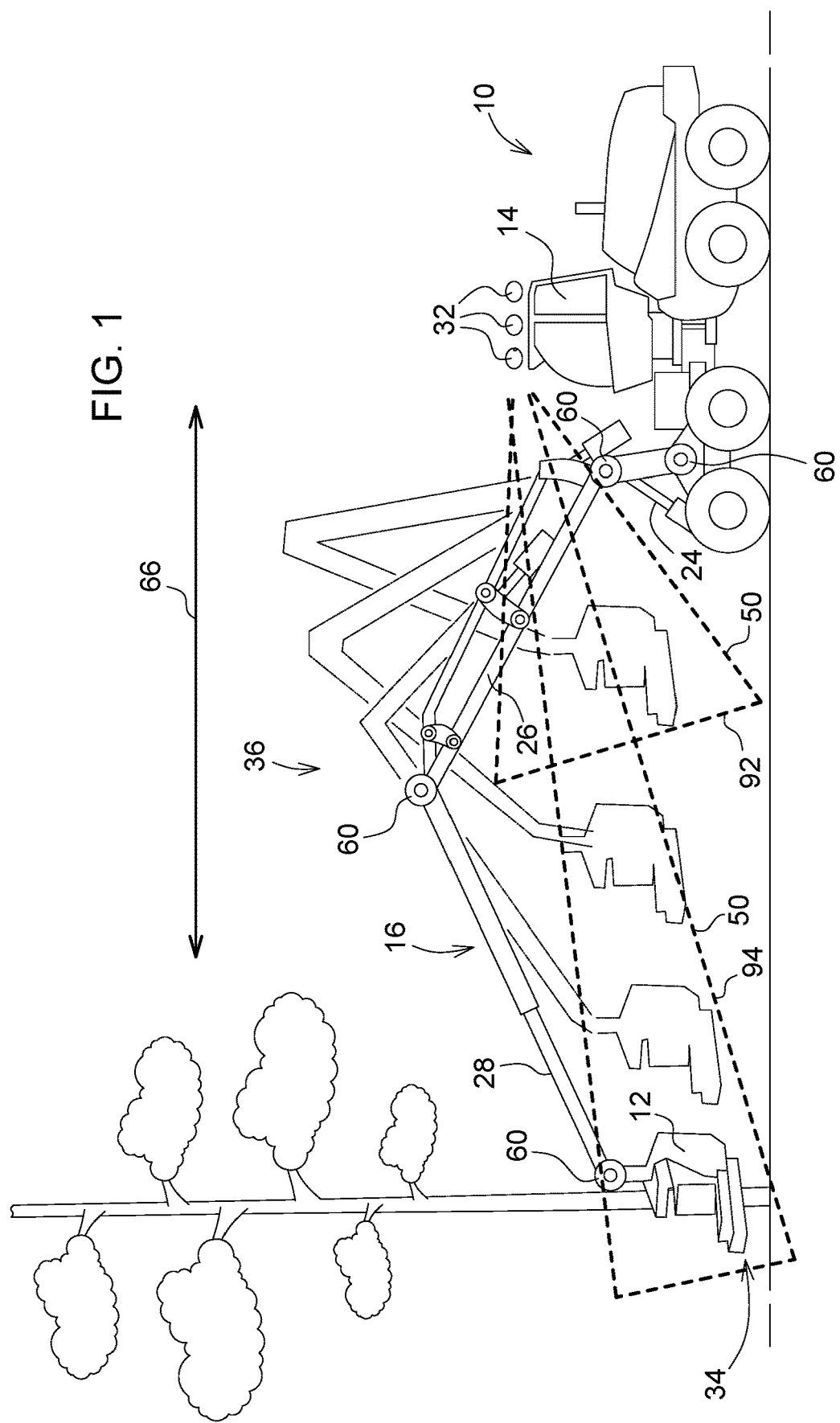
FIG. 1 illustrates a work vehicle in accordance with an embodiment of the present disclosure.
Figure 2:
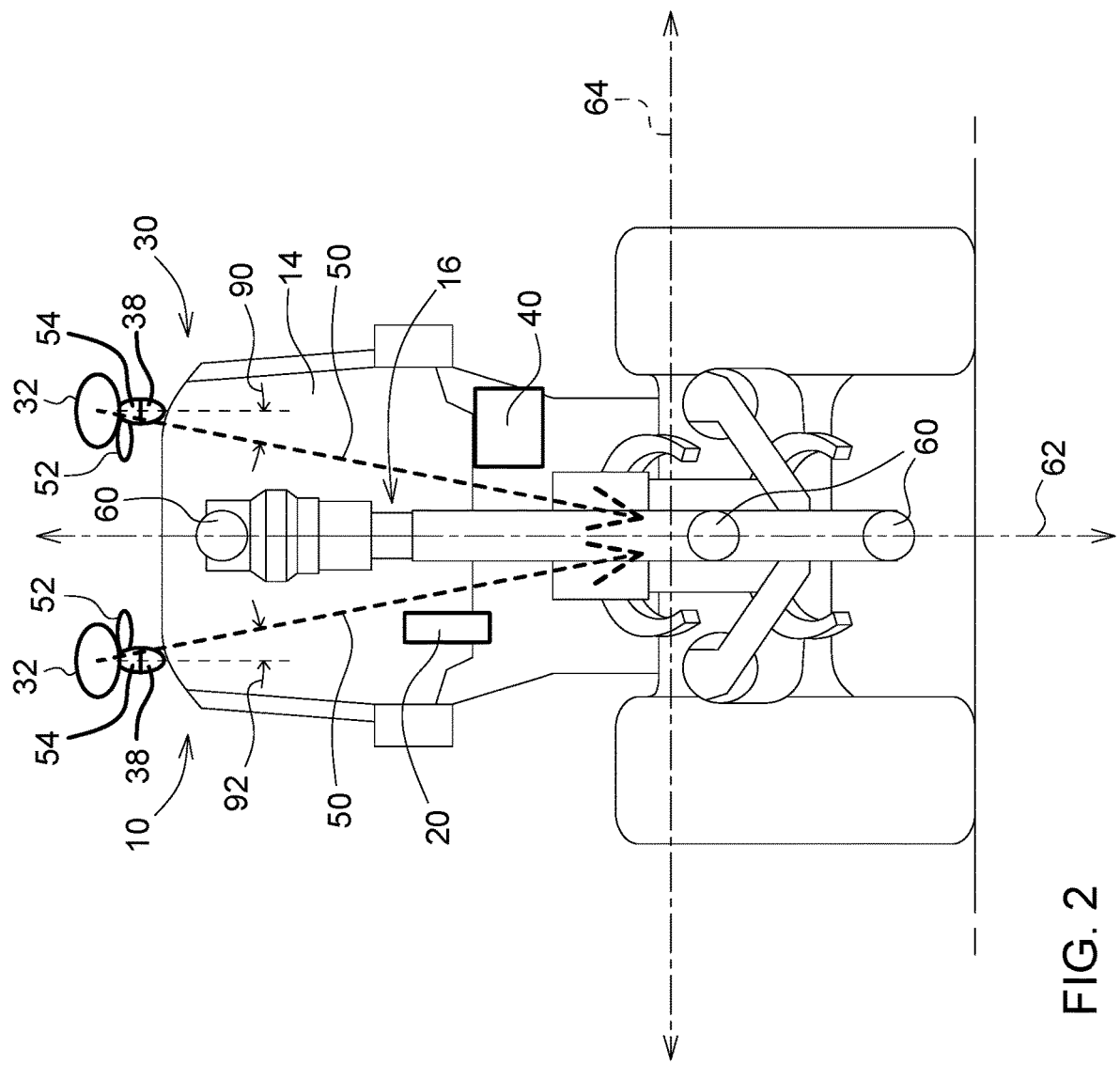
FIG. 2 illustrates a work vehicle in accordance with an embodiment of the present disclosure.
Figure 3:
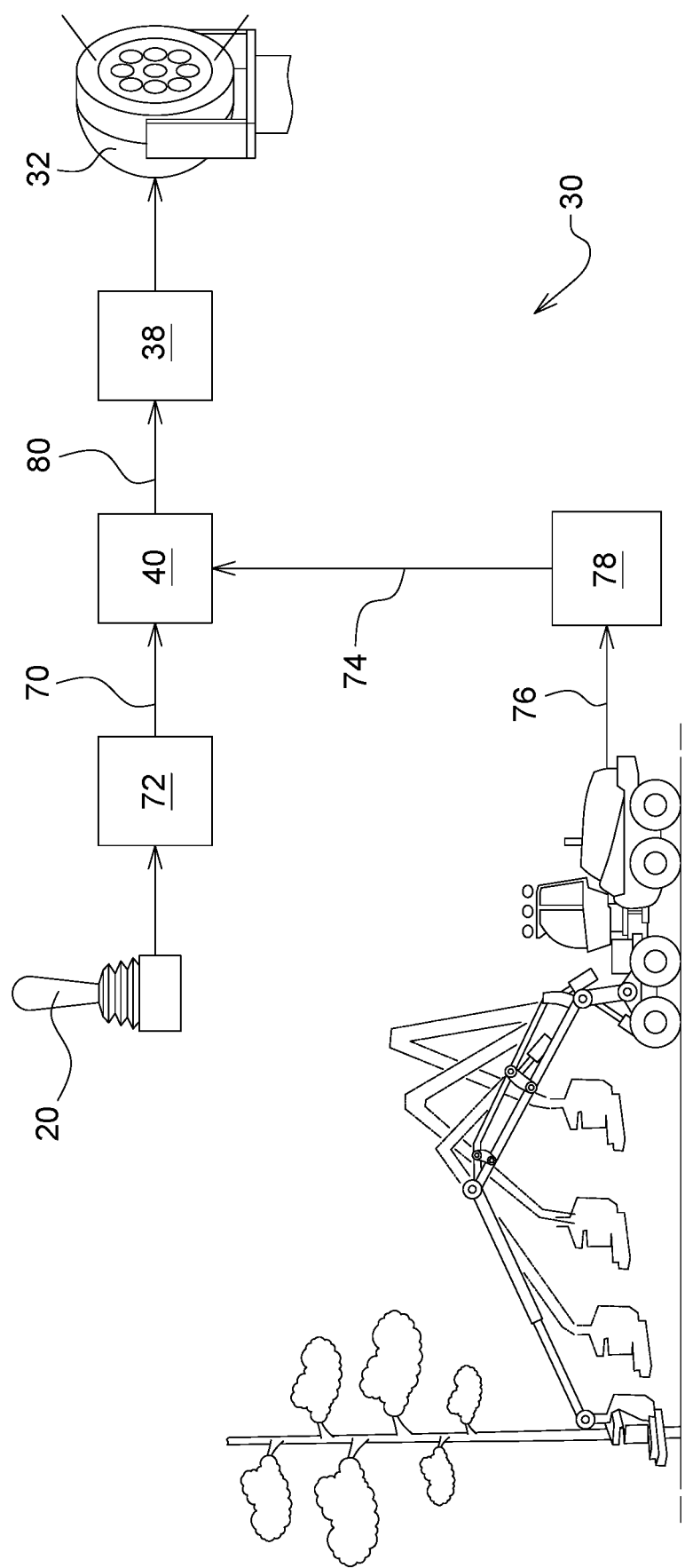
FIG. 3 is a schematic view of a lighting system in accordance with an embodiment of the present disclosure.

At least one example embodiment of the subject matter of this disclosure is understood by referring to FIGS. 1 through 3 of the drawings.

Referring now to FIG. 1, a work vehicle 10 having a work tool 12 is illustrated in accordance with an embodiment of the present disclosure. The work vehicle 10 is illustrated in FIG. 1 as a wheeled harvester having a felling head as the work tool 12, but the work vehicle 10 may include any other type of work vehicle including, without limitation, a forestry, agriculture, or construction vehicle. Similarly, the work tool 12 may include any work tool attached to or otherwise utilized by the work vehicle 10, such as, without limitation, a work tool designed for use in the forestry, agriculture, or construction industries.

The work vehicle 10 of the embodiment of FIG. 1 includes one or more boom(s) 16. The boom 16 of the illustrated embodiment couples the work tool 12 to the work vehicle 10. The position of the work tool 12 is determined by, at least in part, the position of the work vehicle boom 16. In a non-limiting example, upward movement of the boom 16, such as by pivoting of the boom 16 about a horizontal axis at a boom joint 60, raises the work tool 12. The boom 16 show in the illustrated embodiment includes multiple positionable portions 24, 26, 28. The position(s) of one or more of the portions 24, 26, 28 of the boom 16 determines, at least in part, the position of the work tool 12. The boom 16 illustrated in FIG. 1 includes boom joints 60 at each end of each of the portions 24, 26, 28. With reference to FIG. 2 and continuing reference to FIG. 1, in particular non-limiting examples, the work tool 12 is configured to move horizontally via the boom 16 or one or more portions 24, 26, 28 articulating, rotating, pivoting about a vertical axis 62, move vertically via the boom 16 or one or more portions 24, 26, 28 articulating, pivoting, or rotating about a horizontal axis 64, and/or move inwardly and outwardly, or in a direction toward and away from the operator station 14, indicated by arrow 66 in FIG. 1, via telescoping or articulation of the boom 16 or one or more of its portion(s) 24, 26, 28 relative to the operator, operator station 14, or operator controls. In one or more additional embodiments not shown, the work tool 12 and/or the boom 16 is configured to rotate or pivot about a horizontally and/or vertically-extending axis or axes. In one or more further embodiments not shown, the operator station 14 is configured to rotate or pivot about a horizontally and/or vertically-extending axis or axes independent of the work tool 12 and/or the boom 16. In the embodiments illustrated, the boom 16 is directly coupled to a base, frame, chassis, or other portion of the work vehicle 10. Although not shown, in any of the embodiments described herein, the boom 16 may be coupled directly to the operator station 14 such that the boom 16 and the operator station 14 may be configured to rotate, pivot, or otherwise move together relative to a base, frame, chassis, or other portion of the work vehicle 10.

The work vehicle 10 of the embodiment of FIG. 1 includes an operator station 14. An operator (not shown) of the work vehicle 10 is positioned at or in the operator station 14 to permit control and operation of the work vehicle 10. One or more operator control member(s) 20 are located in or near the operator station 14 to allow control interfacing between the operator and the work vehicle 10 and/or any of its systems. The operator control member 20 of one or more embodiments includes, without limitation, a joystick, steering wheel, toggle or other switch, or another input or interface device or component configured to accept operator input. The operator control member 20 in particular embodiments further include multiple components, such two joysticks or toggle switches, in order to accept operator input to control the operation of the work vehicle 10, the boom 16, the work tool 12. The operator station 14 of the illustrated embodiment is disposed behind the boom 16 in the illustrated embodiment, but may be located elsewhere on or near the work vehicle 10.

In a particular example, a joint 60 is located between one or more of the portions 24, 26, 28, the vehicle 10, and/or the work tool 12. The joint 60 of some embodiments may include a boom actuator, a motor or cylinder, or another component capable of senses relative movement between one or more of the portions 24, 26, 28, the vehicle 10, and/or the work tool 12. The vehicle 10, through a controller 40 in an embodiment, determines position, movement, orientation, or another condition of the work tool 12 based on inputs from the operator, such as via the operator control member 20 at the operator station 14. The vehicle 10 or controller 40 then operates the appropriate joint(s) 60 to accomplish the desired position, movement, orientation, or other condition from the operator input. Component or system tolerances, environmental factors, component wear, and/or other factors may contribute and accumulate to create inaccuracies. Accordingly, such inaccuracies may exist and be compounded across the joint(s) 60 of the boom 16 to create differences between an operator command for position, movement, orientation, or another condition of the work tool 12 and an actual, sensed position, movement, orientation, or other condition at the one or more joints 60 representing the sensed or actual location of the work tool 12.

The work vehicle 10 further includes a lighting system 30. The lighting system 30 includes one or more lighting member(s) 32 configured to illuminate one or more portion(s) 34 of a work area 36. The work vehicle 10 in the illustrated embodiment is located within or adjacent to the work area 36. As shown in FIG. 1, the portion 34 of the work area 36 being illuminated is an object or area designated for work by the work tool 12. The lighting system 30 illustrated in FIGS. 1 and 2 shows multiple lighting members 32, but the system 30 of additional embodiments includes one or any number of lighting members 32. Further, although FIGS. 1 and 2 illustrate the lighting members 32 being located atop the operator station 14, the lighting members 32 may be mounted or located at any location on the work vehicle 10.

Referring again to FIGS. 1 and 2, each lighting member 32 is coupled to at least one actuator 38 configured to position the lighting member 32 relative to the operator station 14. As described herein, the position of the lighting member(s) 32 refers to one or more of a physical location, an angular or other orientation, or another physical modulation. In another embodiment, the position of the lighting member 32 refers to the orientation or adjustment of the light emitted from the lighting member 32. In a non-limiting example, the lighting member 32 includes, without limitation, a lens, prism, mirror, and/or other structure configured to manipulate or adjust light of the lighting member 32, and positioning of the lighting member 32 is accomplished via adjustment of the lens, prism, mirror, and/or other structure. In the illustrated embodiment, each lighting member 32 is coupled to an individual actuator 38, but in additional embodiments, multiple lighting members 32 are coupled to the same actuator 38 and/or multiple actuators 38 are coupled to a single lighting member 32.

Referring now to FIG. 3, the system 30 further includes the controller 40 being in communication with the actuator(s) 38. The controller 40 of an embodiment receives an operator control position signal 70 corresponding to an operator control position of the operator control member 20. The operator control position in the illustrated embodiment of FIG. 3 is a desired position of the work tool 12. In a non-limiting example, the operator control member 20 may include a joystick having a position sensor for sensing a position of the joystick. In such an example, the operator control position is a joystick position. A position sensing module, an operator control member sensing module, or other processing module 72 is connected to the position sensor of the operator control member 20 in an embodiment. The module 72 generates and, in at least one embodiment, transmits the operator control position signal 70 to the controller 40.

The controller 40 of the illustrated embodiment further receives a work tool position signal 74 corresponding to a work tool position of the work tool 12. In the illustrated embodiment, joint(s) 60 of the vehicle 10 have a boom actuator, a motor or cylinder, or another component capable of sensing relative movement between one or more of the portions 24, 26, 28, the vehicle 10, and/or the work tool 12. The joint(s) 60 or a value-determining component such as a sensor connected thereto, send(s) angle or other joint signal(s) 76 to a boom position sensing module, work tool position sensing module, or other boom processing module 78. The work tool position signal 74 is then generated or determined by the boom processing module 78 and sent to the controller 40.

The controller 40 is configured to control positioning of the lighting member 32 via the actuator 38 based on the operator control position and a position of the work tool 12. As illustrated in FIG. 3, the controller 40 sends a lighting member position signal 80 to the actuator 38 in an embodiment. In particular, the controller 40 of the illustrated embodiment determines a desired or optimal lighting member position of the lighting member 32 based on the operator control position and the work tool position. The controller 40 generates a lighting member positioning signal, then provides the lighting member positioning signal to position the lighting member 32 at the lighting member position via the lighting member actuator 38 coupled to the lighting member 32. In an embodiment, the controller 40 is in communication with the actuators 38 and is configured to control positioning of the lighting members 32 via the actuators 38 based on the operator control position and the position of the work tool.

In an embodiment, the controller 40 controls positioning of the lighting member 32 via the actuator 38 based on a comparison of the operator control position and the position of the work tool 12. In a non-limiting example, the controller 40 receives an operator control position signal and a work tool position signal and determines if they are not equal to each other or not equal to each other within a predetermined range, such as within 5% of either value. If the two signals are equal within the predetermined range, the controller 40 then controls the positioning of the lighting member 32 according to the operator control position or according to the work tool position, depending on operator selection or a predetermined default setting. If the two signals differ from each other, or have a variance outside of the predetermined range, the controller 40 then controls the positioning of the lighting member 32 in accordance with the higher value of the operator control position and the position of the work tool 12 in an embodiment or the lower value of the operator control position and the position of the work tool 12 in an embodiment, or the controller 40 initiates another action, such as generating an alert or flag.

In a further embodiment, the controller 40 controls positioning of the lighting member 32 via the actuator 38 based on a correction of the operator control position using the position of the work tool 12. In a non-limiting example, the controller 40 modifies a value of the operator control position, such as by an increase or decrease of 1%, in accordance with a corresponding higher or lower value of the position of the work tool 12 as compared to the operator control position, and uses that modified value to control positioning of the lighting member 32. Similarly, in another embodiment, the controller 40 is configured to control positioning of the lighting member 32 via the actuator 38 based on a correction of the position of the work tool. In a non-limiting example, the controller 40 modifies a value of the work tool position, such as by an increase or decrease of 1%, in accordance with a corresponding higher or lower value of the operator control position as compared to the work tool position, and uses that modified value to control positioning of the lighting member 32.

In a further embodiment, the controller 40 controls positioning of the lighting member 32 via the actuator 38 based on an average position between the operator control position and the position of the work tool 12. Accordingly, the controller 40 determines an average position value for the operator control position and the position of the work tool 12 as the lighting member position. The controller 40 then controls positioning of the lighting member 32 in accordance with the lighting member position, such as by transmitting a signal representing the lighting member position corresponding to the average position value to the lighting member via a lighting member actuator 38 coupled to the lighting member 32.

The controller 40 of embodiments is further configured to control activation, intensity, brightness, focus, and/or illumination, in addition to the orientation or position, of one or more lighting member(s) 32 based on a location of the lighting member(s) 32 on the work vehicle 10 and the portion(s) 34 or another desired illumination area of the work area 36. The desired illumination area may be determined by the operator control position. As a non-limiting example, if the desired illumination area is at a front side of the work vehicle 10, the controller 40 will illuminate the lighting member(s) 32 located adjacent the front side and will deactivate or not illuminate the lighting member(s) 32 located adjacent the rear side of the work vehicle 10. The controller 40 of an additional embodiment is further configured to control illumination of multiple lighting members 32 based on locations of each of the lighting members 32 on the work vehicle 10 and the desired illumination area of the work area 36.

In an embodiment, the lighting member 32 is configured to illuminate a portion of the work area 36 with a light beam 50, and the system 30 includes a focus member 52, shown in FIG. 2, establishing a focus of the light beam, as shown in FIG. 1. The focus member 52 includes, without limitation, a lens, prism, mirror, and/or other structure configured to manipulate or adjust light of the lighting member 32. A focus member actuator 54 is coupled to the focus member 52 and is configured to adjust the focus of the light beam 50. The controller 40 of the embodiment is in communication with the focus member actuator 54 and is configured to control the focus of the light beam 50 from the lighting member 32 via the focus member actuator 54 based on the operator control position and the position of the work tool such that the focus of the light beam 50 corresponds to the position of the work tool 12.

Referring to FIG. 2, in an embodiment, the controller 40 is configured to position the lighting members 32 via the actuators 38 such that illumination of each of the lighting members 32 is aligned to focus on the portion 34 or the desired illumination area of the work area 36. In an non-limiting example, two lighting members 32 may be spaced from each other on the work vehicle 10. The controller 40 may align or point each such that the light beam of both focus on the desired illumination area around or near the work tool 12. Accordingly, the controller 40 is configured to move, position, or otherwise control an angle 90, 92 of each of the two lighting members 32 spaced from each other such that each is aligned to illuminate or for illumination in a direction of the portion 34 or desired illumination area of the work area 36.

Referring again to FIG. 1, in an embodiment, the controller 40 illustrated in FIGS. 2 and 3 is configured to control the brightness or intensity of the light beam 50 from the lighting member 32 via a brightness control module or intensity control module based on the operator control position and the position of the work tool such that the brightness or intensity of the light beam 50 corresponds to the position of the work tool 12. In a non-limiting example, the controller 40 may decrease brightness of the lighting member 32 to a first, lower intensity when the operator control position and the position of the work tool 12 are at a first location 92 relatively closer to the work vehicle 10 and may increase brightness to a second, higher intensity when the operator control position and the position of the work tool 12 are at a second location 94 relatively farther from the work vehicle 10. One of ordinary skill in the art will recognize that the controller 40 is further configured to control the focus of the light beam 50 in accordance or combination with such intensity control. The various steps performed by the controller 40 described with regard to positioning the lighting member 32 in the embodiments herein further apply to controlling or changing intensity or focus of the lighting member 32. Further, the vehicle 10, system 30, and controller 40 of some embodiments controls a combination of two or more of the position, intensity, and focus simultaneously based on the operator control position and the work tool position.

Referring now to FIG. 4, a method 100 of illuminating the work area 36 with the work vehicle 10 is illustrated in accordance with an embodiment. The method 100 includes receiving, at step 110, an operator control position signal corresponding to the operator control position of the operator control member 20. The method 100 further includes receiving, at step 112, a work tool position signal corresponding to the work tool position of the work tool 12. The method 100 further includes determining, at step 114, the lighting member position based on the operator control position and the work tool position. The method 100 further includes positioning, at step 116, the lighting member 32 at the lighting member position via the lighting member actuator 38 coupled to the lighting member 32.

In additional embodiments, the method 100 includes determining the lighting member position by comparing the operator control position to the work tool position. The method 100 may further include determining the lighting member position by correcting the operator control position using the work tool position or correcting the work tool position using the operator control position. The method 100 of additional embodiments includes any other steps or operations performed by the controller 40, vehicle 10, and/or the system 30 described in the embodiments herein.

Without in any way limiting the scope, interpretation, or application of the claims appearing below, it will be appreciated that the vehicle 10, system 30, and controller 40 of the embodiments of the present disclosure provide the ability to accurately and reliably illuminate a desired portion of the work area 36. In particular operations, such as forestry operations involving nighttime cutting, harvesting, and moving operations to name a non-limiting example, sufficient illumination of the work tool 12 is highly desired. The operator will be able to operate the work vehicle 10 over more hours without the need to cease operations. Further, with the embodiments described herein, fewer lights are necessary around the work vehicle 10 as the lighting members 32 may be controlled to illuminate different portions of the work area 36 around the work vehicle 10, thereby reducing the operational and overall cost, the weight, and the complexity of the work vehicle 10. Even further, the automation or control of lighting positioning, focus, and intensity improves operator strain, reduces operator fatigue, and allows the operator to concentrate more on the work tool 12, the work area 36, and/or the operations of the work vehicle 10.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. An adaptive lighting system for a work vehicle controlled by an operator from an operator station and having a work tool, the system comprising:
   at least one lighting member configured to illuminate at least one portion of a work area;
   an actuator coupled to the at least one lighting member and configured to position the at least one lighting member relative to the operator station;
   a controller in communication with the actuator and configured to control positioning of the at least one lighting member via the actuator based on an operator control position and a position of the work tool.

2. The lighting system of claim 1, wherein the controller is configured to control positioning of the at least one lighting member via the actuator based on a comparison of the operator control position and the position of the work tool.

3. The lighting system of claim 1, wherein the controller is configured to control positioning of the at least one lighting member via the actuator based on a correction of one of the operator control position and the position of the work tool using the other of the operator control position and the position of the work tool.

4. The lighting system of claim 1, wherein the controller is configured to control positioning of the at least one lighting member via the actuator based on an average position between the operator control position and the position of the work tool.

5. The lighting system of claim 1, further comprising a work vehicle boom coupling the work tool to the work vehicle, wherein the position of the work tool is at least partially determined by a position of the work vehicle boom.

6. The lighting system of claim 5, wherein the work vehicle boom comprises a plurality of positionable portions, the position of the work tool being determined by positions of each of the plurality of positionable portions of the work vehicle boom.

7. The lighting system of claim 1, wherein the controller is further configured to control illumination of the at least one lighting member based on a location of the at least one lighting member on the work vehicle and a desired illumination area of the work area.

8. The lighting system of claim 7, wherein the desired illumination area is determined by the operator control position.

9. The lighting system of claim 7, wherein the controller is further configured to control illumination of a plurality of lighting members based on locations of each of the plurality of lighting members on the work vehicle and the desired illumination area of the work area.

10. The lighting system of claim 1, wherein the at least one lighting member comprises a plurality of lighting members configured to illuminate the at least one portion of the work area, each of the plurality of lighting members being coupled to at least one of a plurality of actuators, each of the at least one of the plurality of actuators being configured to position each of the plurality of lighting members relative to the operator station, the controller being in communication with the plurality of actuators and being configured to control positioning of the plurality of lighting members via the plurality of actuators based on the operator control position and the position of the work tool.

11. The lighting system of claim 10, wherein the controller is further configured to position the plurality of lighting members via the plurality of actuators such that illumination of each of the plurality of lighting members is aligned to focus on the at least one portion of the work area.

12. The lighting system of claim 11, wherein the controller is further configured to position an angle of each of at least two of the plurality of lighting members spaced from each other such that each of the at least two of the plurality of lighting members is aligned for illumination in a direction of the at least one portion of the work area.

13. An adaptive lighting system for a work vehicle controlled by an operator and having a work tool, the system comprising:
   at least one lighting member configured to illuminate at least one portion of a work area with a beam of light;
   a focus member establishing a focus of the beam of light;
   a focus member actuator coupled to the focus member and configured to adjust the focus of the beam of light;
   a controller in communication with the focus member actuator and configured to control the focus of the beam of light from the at least one lighting member via the focus member actuator based on an operator control position and a position of the work tool such that the focus of the beam of light corresponds to the position of the work tool.

14. The lighting system of claim 13, wherein the controller is configured to control the focus of the beam of light via the focus member actuator based on a comparison of the operator control position and the position of the work tool.

15. The lighting system of claim 13, wherein the controller is configured to control the focus of the beam of light via the focus member actuator based on a correction of one of the operator control position and the position of the work tool using the other of the operator control position and the position of the work tool.

16. The lighting system of claim 13, wherein the controller is configured to control the focus of the beam of light via the focus member actuator based on an average position between the operator control position and the position of the work tool.

17. The lighting system of claim 13, wherein the operator control position comprises a joystick position.

18. A method of adaptively illuminating a work area with a work vehicle having a work tool, the method comprising:
   receiving an operator control position signal corresponding to an operator control position of an operator control member;
   receiving a work tool position signal corresponding to a work tool position of the work tool;
   determining a lighting member position based on the operator control position and the work tool position;
   positioning a lighting member at the lighting member position via a lighting member actuator coupled to the lighting member.

19. The method of claim 18, wherein determining the lighting member position comprises comparing the operator control position to the work tool position.

20. The method of claim 18, wherein determining the lighting member position comprises correcting one of the operator control position and the work tool position with the other of the operator control position and the work tool position.

* * * * *